United States Patent [19]
Görtler et al.

[11] Patent Number: 6,034,352
[45] Date of Patent: Mar. 7, 2000

[54] ARRANGEMENT OF A HEATING DEVICE IN A VEHICLE

[75] Inventors: Thomas Görtler, Weissenhorn; Martin Goretzka, Stuttgart; Fritz Mohring, Ostfildern, all of Germany

[73] Assignee: J. Eberspächer GmbH & Co., Esslingen, Germany

[21] Appl. No.: 08/939,143

[22] PCT Filed: Sep. 3, 1996

[86] PCT No.: PCT/DE96/01674

§ 371 Date: Sep. 29, 1997

§ 102(e) Date: Sep. 29, 1997

[87] PCT Pub. No.: WO97/15465

PCT Pub. Date: May 1, 1997

[30] Foreign Application Priority Data

Oct. 21, 1995 [DE] Germany ................ 195 39 258

[51] Int. Cl.[7] ............................................. B60L 1/02
[52] U.S. Cl. ................................ 219/202; 237/12.3
[58] Field of Search .......................... 219/200, 201, 219/202, 205, 206, 535, 536, 549, 203; 237/12.3, 12.3 B, 12.3 C; D23/324, 328; 392/365

[56] References Cited

U.S. PATENT DOCUMENTS

| 5,017,758 | 5/1991 | Kirkman et al. | 219/205 |
| 5,291,000 | 3/1994 | Hornberger | 219/539 |
| 5,855,319 | 1/1999 | Burner et al. | 237/12.3 |

FOREIGN PATENT DOCUMENTS 37 12 670 A1  11/1988  Germany.

*Primary Examiner*—Tu Ba Hoang
*Attorney, Agent, or Firm*—McGlew and Tuttle, P.C.

[57] ABSTRACT

A motor vehicle heater arrangement is provided, the arrangement being connected to a vehicle. The vehicle heater arrangement includes a heater with a heater housing and with at least one of an engine coolant medium circuit connection and a motor vehicle interior space heating system heating medium connection defining a heating/cooling medium feed line connection and heating/cooling medium return line connection and with a fuel feed line connection. A water protection device is provided with the heater housing disposed therein. The heater and the water protection device are fastenable on an underside of the vehicle bottom. One of the heater housing and the water protection device has integrated securing points for securing to the vehicle floor.

19 Claims, 3 Drawing Sheets

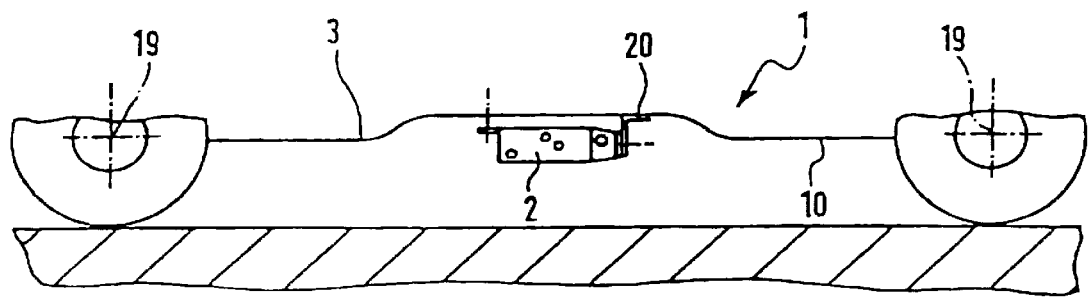
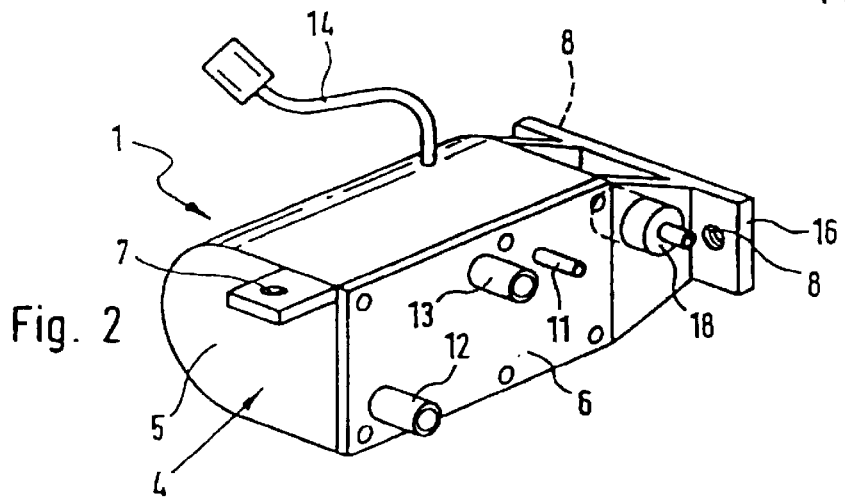
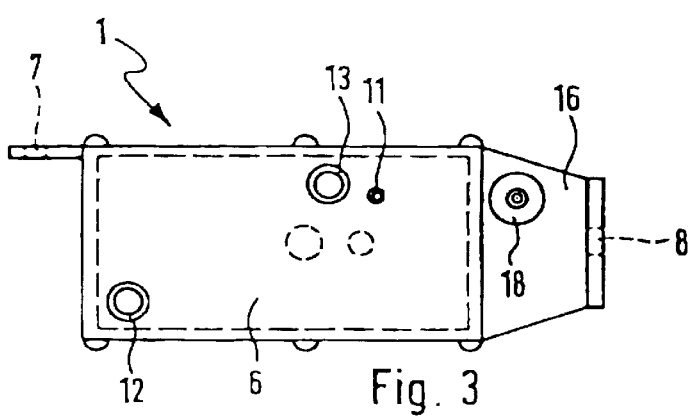

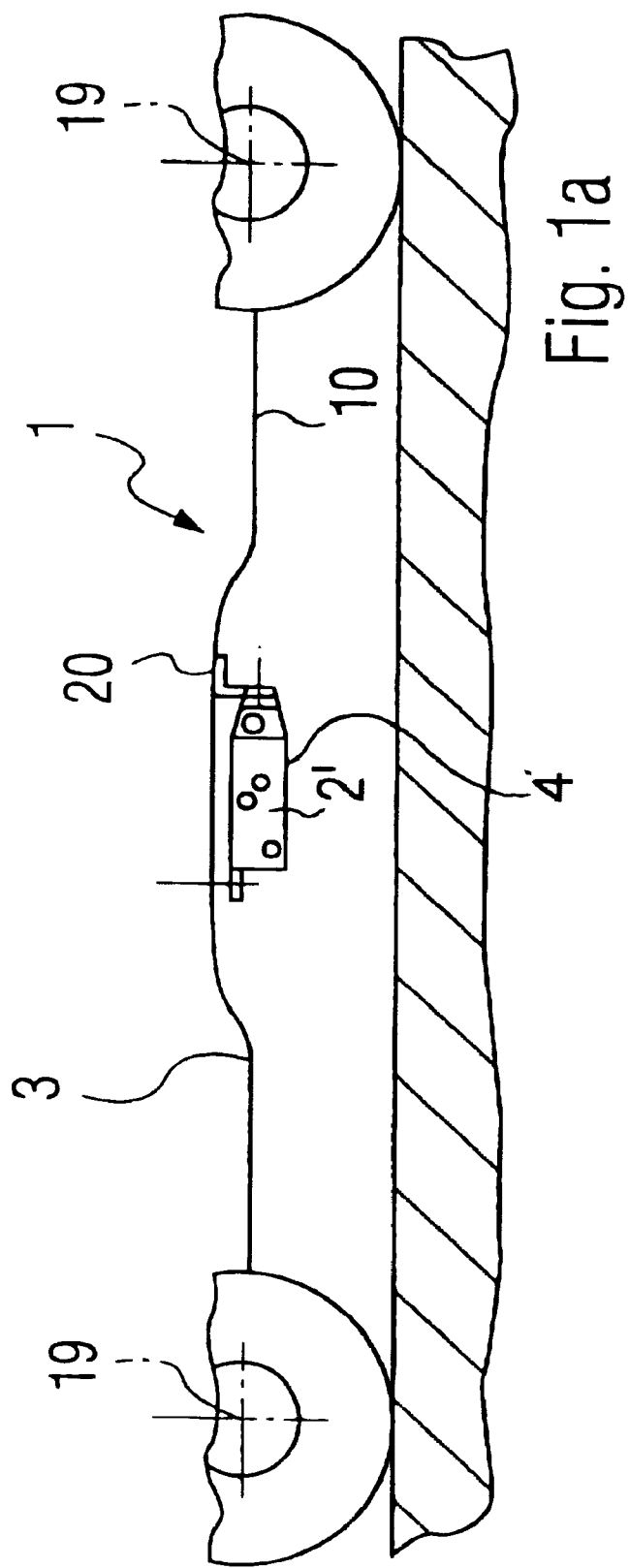

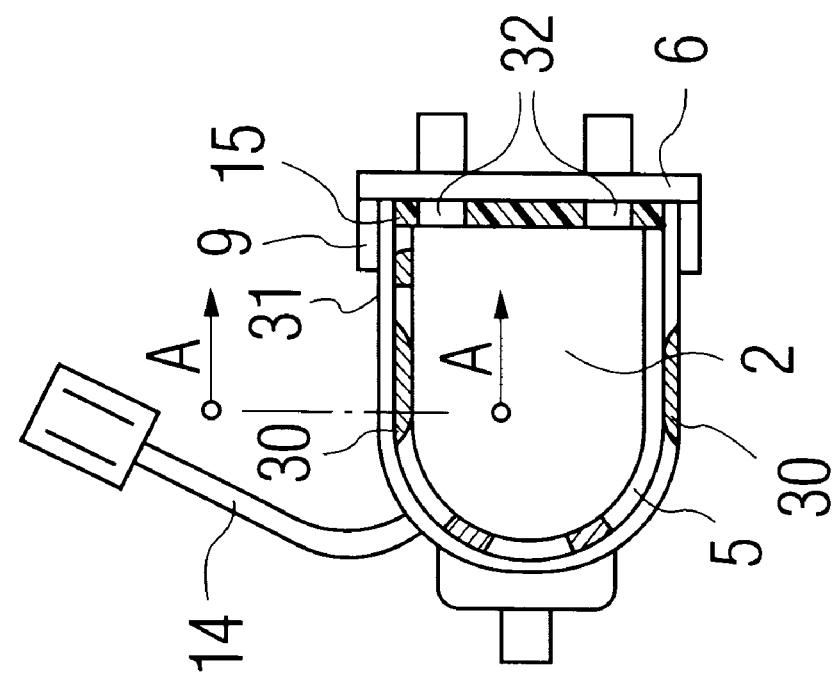
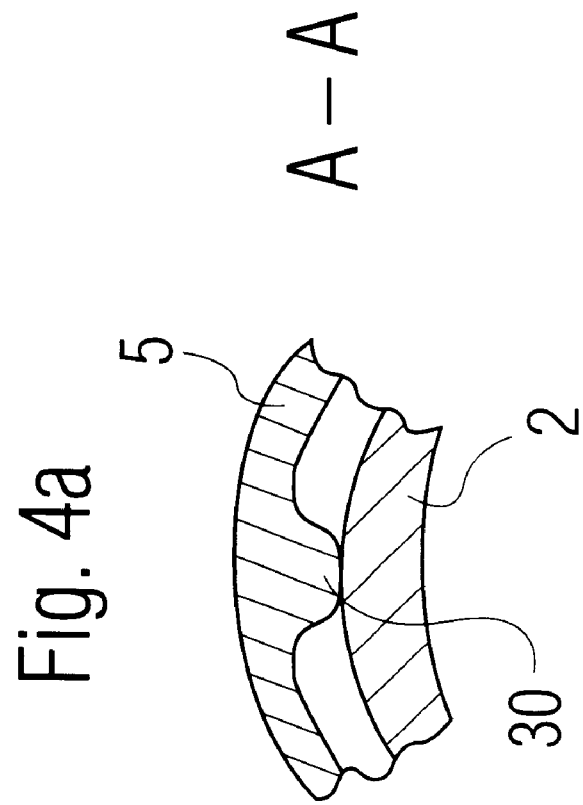
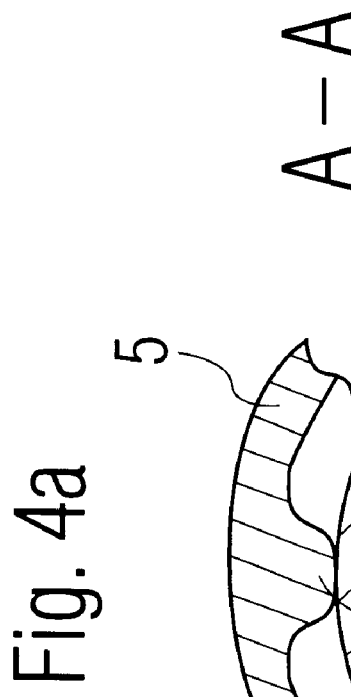

ARRANGEMENT OF A HEATING DEVICE IN A VEHICLE

FIELD OF THE INVENTION

The present invention pertains to an arrangement of a heater in a vehicle.

BACKGROUND OF THE INVENTION

Heaters in a motor vehicle are known to be accommodated protected in the engine compartment or the interior space and require a relatively large space for installation, which could be used for other purposes.

SUMMARY AND OBJECTS OF THE INVENTION

The primary object of the present invention is to provide a heater arrangement in a vehicle, which saves installation space in the interior area of a vehicle with comparatively simple means without compromising the heat output.

According to the invention, an arrangement of a heater in a vehicle is provided with a heater provided with a water protection device. The heater is fastened on the underside of the vehicle bottom.

The essence of the present invention is to fasten the heater arrangement on the underside of the vehicle bottom, wherein the heater has a water protection device. A previously unused installation site is thus utilized on the vehicle. More installation space is correspondingly left for other assembly units of the vehicle in the engine compartment or the interior space. One particular advantage of the present invention is that the present invention makes it possible to retrofit a vehicle with a heater in a simple manner. This also applies, in particular, to the later installation of the heater in a vehicle, which cannot be retrofitted according to the state of the art, namely, in the case of a vehicle that inherently has no more place for an additional heater in the engine compartment or in the interior space of the vehicle. The new installation area under the bottom of the vehicle, mostly between the vehicle axles, is also largely protected from damage by these axles.

According to one advantageous variant of the present invention, the water protection device is a solid protective container, which can be fastened to the underside of the vehicle bottom, wherein the heater is accommodated in the protective container. A solid protective container offers protection not only against water, but also against mechanical effects, e.g., falling, thrown or flying rocks.

The solid protective container may be a sheet-metal part, a plastic part or a casting, especially a diecast aluminum part, and it can be manufactured in a simple manner.

The heater is preferably accommodated in the protective container in a positive-locking manner, and the protective container may have inner guide ribs.

The heater may be fastened in the protective container by fastening elements, especially clamps or thumb screws or be additionally secured in the case of positive-locking mounting.

The protective container preferably has integrated fastening support points for fastening to the underside of the vehicle bottom. In the case of a diecast aluminum container, the support points, of which there are preferably three, are cast integrally. The mounting of the container on the vehicle is simplified by the integrated support points.

The protective container preferably has a lateral sealing cover, which can be detachably fastened, especially screwed, to a preferably trough-shaped base part of the protective container. With the lateral sealing cover removed, a heater can consequently be introduced into and removed from the interior of the container and maintenance can be performed on it from the vehicle side in a simple manner.

The cover is advantageously designed as a flat cover for reasons of manufacturing and handling.

The cover preferably has a circumferential edge for better sealing of the container against dirt and water.

Connecting branches or passage openings for connection lines of the heater, e.g., for the heater/cooling medium circuit to an internal combustion engine, for fuel supply to the heater and/or the electrical operation of the heater during the start-up phase of a motor vehicle and for an electrical control of the heater are preferably provided in the cover.

The base part of the protective container may also have connecting branches or passage openings for connection lines, e.g., for an electric connection line.

The sealing cover is advantageously detachably watertightly connected, especially screwed to the base part of the container via a preferably flat, embossed seal acting as a cushion for the heater accommodated. The passage openings are also sealed in a watertight manner by this seal or by separate sealing elements and/or cushion elements with the connecting lines in place.

An advantageous variant of the present invention is characterized in that the protective container has a fastening bracket on the outside of the container, in which bracket a fuel feed pump of the heater may be fastened. A simple, compact device, with which a vehicle can be easily retrofitted and which can be mounted with ease, is provided by a fuel feed pump fastened in the bracket.

The fastening bracket is made especially in one piece with the base part of the protective container.

The fastening bracket may also have support points for fastening the protective container at the vehicle, and the support points of the fastening bracket preferably extend essentially horizontally, while the other support point or support points of the protective container is/are arranged essentially vertically.

The water protection device does not necessarily have to be a solid component. The water protection device may optionally be a coating or a flexible wrap of the heater, especially a paint coat or a film wrap, in which case the heater has the fastening points for fastening to the underside of the vehicle bottom.

A water protection means under a vehicle bottom may be abandoned altogether in special applications if a heater is in an especially protected position under a vehicle bottom.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic vertical sectional view of a motor vehicle in the bottom area with built-in underfloor heater arrangement;

FIG. 1A is a schematic vertical sectional view of a motor vehicle in the bottom area with built-in underfloor heater arrangement according to another embodiment of the invention;

FIG. 2 is a schematic perspective view of the arrangement according to FIG. 1;

FIG. 3 is a side view of the arrangement according to FIG. 2;

FIG. 4 is a schematic cross section of the arrangement according to FIG. 3; and

FIG. 4A is a partial sectional view taken along line A—A of FIG. 4.

DESCRIPTION OF THE PREFERRED EMBODIMENTS

Referring to the drawings in particular, the invention comprises an arrangement 1 of a heater 2 is provided in a vehicle 3, on the underside 10 of the vehicle bottom.

The heater arrangement 1 is fastened in an underfloor installation position between the vehicle axles 19 via at least one angle bracket 20.

The heater 2, especially a parking heater, with which a vehicle is retrofitted, and for which there is no space left in the engine compartment, is accommodated, protected and slip-free, i.e., partially in a positive-locking manner and therefore free from clearance, in a solid, watertight protective container 4, which forms a protection means against water, dirt and mechanical effects and is at the same time the fastening means of the heater on the vehicle.

The protective container 4 has, in particular, a trough-shaped base part 5 with an opening, which is a lateral opening in the built-in state of the arrangement, and with a lateral, flat sealing cover 6, which covers the lateral opening via a punched flat seal or sealing elements 15. The flat seal is also used as a contact surface for a heater 2 accommodated in the container and as a cushion.

The sealing cover 6 is provided with a circumferential edge 9, which ensures the watertight sealing of the cover with the base part 5 of the protective container 4 in the screwed state. The cover is flat and has passage openings or connection branches for connecting lines 11, 12, 13, which are accommodated in the cover in the built-in state of the lines. The connecting line 11 is a fuel feed line from a fuel fed pump 18, which will be described later. The connecting line 12 is the feed line of a heating/cooling medium of a heating/cooling medium circuit of an internal combustion engine (not shown), and the connecting line 13 is the heating/cooling medium return line belonging to the above-mentioned system.

The trough-shaped base part 5 of the protective container 4 is also provided, according to the exemplary embodiment shown in the drawing, with a passage opening or a branch, which is provided for an electric connecting line 14 leading to the heater 2 inside the protective container. The electrical connecting line supplies the heater with electricity for a heating operation during the start-up phase of the motor vehicle 3 as well as for the electronic control of the heater.

FIG. 4 shows the trough-shaped base part 5 which includes inner guide ribs 30 for fitting the base part five to the heater 2. The ribs 30 are also shown in FIG. 4 A. A plant 31 is provided for fastening the protective container 4 to the heater 2. The openings 32 for the feed lines are also shown.

The protective container 4 also includes an integrated fastening bracket 16 for receiving and fastening the fuel feed pump 18 in the transverse extension in relation to the vehicle 3.

The base part 5 of the protective container 4, including the fastening bracket 16, is a one-piece diecast part made of aluminum and has integrally cast support points 7, 8 for fastening to the vehicle. In the exemplary embodiment shown in the drawing, the fastening bracket 16 includes two horizontal fastening support points 8 for fastening to an angle bracket 20, which in turn is fastened on the underside 10 of the vehicle bottom. In addition, an integrated vertical fastening support point 7, which permits the direct fastening of the heater arrangement on the vehicle bottom, is provided at the base part 5.

As is seen, an arrangement 1 is provided according to the present invention for a heater 2 with a water protection device in the form of a protective container 4 or housing, which itself is used to fasten the device on the underside 10 of a vehicle bottom. The protective container has a mounting cover screwed on tightly and a mounted fuel feed pump of compact design for simple mounting on the underside 10 of the motor vehicle bottom, as a result of which the arrangement is especially suitable for critical cases of installation in a motor vehicle.

FIG. 1A shows a heater 2' with a coating 4' that wraps the heater 2'. The coating 4' includes one of paint coat and a foil wrap. In this embodiment, the heater 2' has said the fastening points for fastening the arrangement to the underside of the vehicle bottom.

While specific embodiments of the invention have been shown and described in detail to illustrate the application of the principles of the invention, it will be understood that the invention may be embodied otherwise without departing from such principles.

We claim:

1. A motor vehicle heater arrangement, the vehicle heater arrangement comprising:

a heater with a heater housing and with at least one of an engine coolant medium circuit connection and a motor vehicle interior space heating system heating medium connection defining a heating/cooling medium feed line connection and heating/cooling medium return line connection and with a fuel feed line connection;

a water protection device provided with said heater housing disposed therein, said heater and said water protection device together being fastened on an underside of the vehicle bottom for saving installation space in the engine compartment of the vehicle, one of said heater housing and said water protection device having integrated securing points for securing to the vehicle floor.

2. The arrangement in accordance with claim 1, wherein said water protection device is a solid protective container, said heater being accommodated in said solid protective container.

3. The arrangement in accordance with claim 2, wherein said protective container is one of a sheet-metal part, a plastic part a casting and a diecast aluminum part.

4. The arrangement in accordance with claim 1, wherein said water protection device has inner guide ribs for fitting to said heater housing.

5. The arrangement in accordance with claim 2, wherein said heater is fastened in said protective container by fastening elements.

6. The arrangement in accordance with claim 2, wherein said securing points are provided as an integral part of said protective container.

7. The arrangement in accordance with claim 1, wherein the water protection device is a coating wrapping said heater, including one of a paint coat and a foil wrap, wherein the said heater has said integrated securing points for securing to the vehicle floor.

8. A heater and vehicle arrangement, comprising:

a vehicle with a bottom having an underside;

a heater with a heater housing and with at least one of an engine coolant medium circuit connection and a motor vehicle interior space heating system heating medium connection defining a heating/cooling medium feed line connection and a heating/cooling medium return line connection and with a fuel feed line connection; and a water protection device defining an enclosure with said heater housing disposed within said water protection device, said water protection device and said heater together being fastened on said underside the vehicle bottom for saving installation space in the engine compartment of the vehicle, one of said heater housing and said water protection device having integrated securing points for securing to the vehicle bottom.

9. The arrangement in accordance with claim 8, wherein said water protection device is a solid protective container, said heater being accommodated in said protective container, said water protection device including said integrated securing points, securing the heater and protective container between wheels of the vehicle.

10. The arrangement in accordance with claim 8, wherein the water protection device is a coating wrapping said heater, including one of a paint coat and a foil wrap, wherein the said heater has said integrated securing points for securing to the vehicle floor, between wheels of the vehicle.

11. A heater arrangement in a vehicle, comprising:

a heater; and a solid protective container water protection device including connecting lines for said heater and connection parts for fastening said protective container water protection device to a bottom of the vehicle for saving installation space in the engine compartment of the vehicle, said heater being accommodated in said protective container water protection device, said protective container water protection device including a lateral sealing cover and a trough-shaped base part, said lateral sealing cover being detachably fastened to said trough-shaped base part of said protective container water protection device.

12. The arrangement in accordance with claim 11, wherein said sealing cover is flat and has a circumferential edge.

13. The arrangement in accordance with claim 11, wherein said sealing cover has passage openings for said connecting lines of said heater.

14. The arrangement in accordance with claim 11, wherein said base part has a passage opening for an electric connecting line.

15. The arrangement in accordance with claim 14, wherein said passage openings is sealed in a watertight manner by sealing elements with said electric connecting line.

16. A heater arrangement in a vehicle, comprising:

a heater;

a heater feed pump; and a solid protective container water protection device including connection parts for fastening said protective container water protection device to a bottom of the vehicle for saving installation space in the engine compartment of the vehicle, said heater being accommodated in said protective container water protection device, said protective container water protection device including a fastening bracket on an outside of said container, said feed pump being fastened to said fastening bracket.

17. The arrangement in accordance with claim 16, wherein said fastening bracket is made in one piece with a base part of said protective container water protection device.

18. The arrangement in accordance with claim 16, wherein said fastening bracket has support points for fastening said protective container to the vehicle.

19. The arrangement in accordance with claim 18, wherein said support points of said fastening bracket extend essentially horizontally and said protective container water protection device has a support point arranged essentially vertically.

* * * * *